United States Patent [19]

Burba et al.

[11] 4,278,713

[45] * Jul. 14, 1981

[54] POLYVINYL CHLORIDE PLASTISOLS

[75] Inventors: Christian Burba, Ascheberg-Herbern; Hans-Guenter Volland, Unna; Norbert Esper, Bergkamen, all of Fed. Rep. of Germany

[73] Assignee: Schering Aktiengesellschaft, Berlin and Bergkamen, Fed. Rep. of Germany

[*] Notice: The portion of the term of this patent subsequent to Apr. 24, 1996, has been disclaimed.

[21] Appl. No.: 115,567

[22] Filed: Jan. 28, 1980

[30] Foreign Application Priority Data

Feb. 17, 1979 [DE] Fed. Rep. of Germany ....... 2906134

[51] Int. Cl.$^3$ .............................................. B05D 3/02
[52] U.S. Cl. ................................. 427/388.2; 156/333; 260/31.6; 260/33.6 PQ; 427/385.5; 427/388.5; 427/389.7; 427/389.9; 525/330; 525/375; 525/379; 528/492
[58] Field of Search ....................... 525/375, 379, 330; 260/29.6 MN, 32.8 A, 31.6, 33.6 PQ; 528/492; 156/333; 526/344.2, 344, 344.1; 427/385.5, 388.2, 388.4, 388.5, 389.7, 389.9

[56] References Cited

U.S. PATENT DOCUMENTS

| | | | |
|---|---|---|---|
| 3,998,794 | 12/1976 | Muller et al. | 260/33.4 UR |
| 4,151,317 | 4/1979 | Burba et al. | 427/388.5 |

FOREIGN PATENT DOCUMENTS

| | | |
|---|---|---|
| 1934763 | 1/1971 | Fed. Rep. of Germany . |
| 2221170 | 11/1973 | Fed. Rep. of Germany . |
| 2419016 | 11/1974 | Fed. Rep. of Germany . |
| 1443750 | 5/1966 | France . |
| 1455701 | 11/1976 | United Kingdom . |

OTHER PUBLICATIONS

Chemical Abstracts 75, 7537n, (1971).

*Primary Examiner*—Ronald H. Smith
*Assistant Examiner*—Thurman K. Page
*Attorney, Agent, or Firm*—Curtis, Morris & Safford

[57] ABSTRACT

What is disclosed are a method for protectively coating a substrate which comprises applying to said substrate a coating of a plastisol containing a vinyl chloride polymer and then baking the coating at a temperature from 120° C. to about 200° C., said plastisol further comprising from about 0.1 to about 4.0 percent, by weight of said plastisol, of a Schiff base containing from 0.05 to 1.0 azomethine groups per 100 grams of compound and further containing a uretidine dione or isocyanurate group in the molecule and a plastisol such as is used in this method.

8 Claims, No Drawings

POLYVINYL CHLORIDE PLASTISOLS

The present invention relates to improved plastisols containing, as an adhesion-improving additive, a Schiff base containing uretidine dione groups or isocyanurate groups and to methods of preparing coatings on metallic articles with such improved plastisols.

The resistance to decomposition of polyvinyl chloride or its copolymers in the presence of aggressive media has long been known in the art and is widely utilized for the protection of metallic surfaces against corrosion, for adhering thin sheet metal construction, and for sealing welded seams, particularly in the automobile industry.

Such coatings are primarily applied in the form of plasticized vinyl chloride polymers (plastisols) by painting, rolling, or spraying onto the surface of the article to be protected. In a widely-used form, such coating materials (plastisols) comprise a polyvinyl chloride which can be made into a paste and which is characterized by a definite capacity to swell in a plasticizer, a plasticizer or plasticizer mixture, fillers, and stabilizers, as well as otptional coloring pigments and auxiliary agents for working polyvinyl chloride.

The formulation of plasticized polyvinyl chloride coating compositions, their preparation, and techniques for using them are extensively described in Krekeler Wick, Kunststoff-Handbuch (Volume II, Part 1,) pages 396 et seq. (1963), incorporated herein by reference.

It is known that an essential criterion for evaluating plastisols applied in this way is their adhesion to the coated articles. This is true above all for coatings on metal parts. A loose adhesion of the protective layer increases the danger of penetration of aggressive media. In case of a coating, for example, in this way a material such as water can easily migrate under the coating and corrode the metal. This is all the more possible the looser is the adhesion of the protective film on the metal.

According to certain prior art, isocyanurate polymers, prepared in high-boiling esters, have been added to PVC plastisols in order to improve their ability to adhere to synthetic fabrics. On substrates which are difficult to ahdere, such as aluminum which has not been pre-treated, there is insufficient adhesion.

In still other prior art, two-component systems comprising polyurethanes containing uretidine dione groups and polyketimines are described for the preparation of crosslinked shaped bodies and films. A satisfactory adhesion on aluminum which has not been pre-treated cannot be achieved with this sytem.

Still other prior art describes aminosilanes as adhesion improvers for PVC plastisols used in special fields. These products show considerably improved adhesion properties. However, their use must remain restricted to expensive special products since their inclusion in mass-produced articles cannot be realized for reasons of cost.

According to proposals which, until now, have not been part of the state of the art, a decrease in cost can be achieved—while retaining good adhesion properties—by adding compounds having at least one azomethine and one silane group in the molecule, or corresponding mixtures of two or more of these compounds, to a plastisol formulation. However, these products also are still relatively expensive for use in mass production.

Finally, U.S. Pat. No. 4,151,317 describes plastisols containing, as an adhesion improver, an adduct formed between substantially equivalent amounts of a ketimine (Schiff base) and an isocyanate. These plastisols are taught as particularly adherent to "uncoated metal surfaces, on metal surfaces precoated with a paint, ground, or primer, and particularly on greasy surfaces such as are often found on metals treated to make them corrosion resistant."

Thus, there remains a need for economical plastisols with which highly adherent bonds can be prepared between the most diverse materials, particularly also in the case of substrates which are difficult to adhere such as aluminum which has not been pre-treated.

The invention has as its object to find adhesion improvers for PVC plastisols which do not have the aforementioned disadvantages and which also will show a high adhesion of protective coatings or a high bond strength of adhesive bonds also on difficult substrates such as, for example, glass and aluminum which has not been pre-treated.

A feature of the invention are plastisol compositions showing such improved adhesion, which compositions comprise finely-divided polyvinyl chloride or a vinyl cloride copolymer, conventional fillers and additives and, as an adhesion improver (optionally together with conventional adhesion improvers), from 0.1 to 4.0 percent, preferably from 0.3 to 2.0 percent, by weight of the PVC formulation, of a Schiff base containing ureti-dine dione groups or isocyanurate groups in the molecule and having from 0.05 to 1.0, preferably from 0.05 to 0.6, azomethine groups/per 100 g of the compound.

Another feature of the invention are methods for preparing coatings on metallic articles by coating an article with such a plastisol composition and then baking the coatings at temperatures between 100° C. and 200° C.

A particular advantage of the plastisols according to the present invention is that they can be baked-on already at relatively low temperatures, namely between 100° C. and 200° C., particularly between 120° C. and 160° C. Further, they give coatings which show very good adhesion and which do not lead to interfering color changes, structural-defects, or blister formation on normal metallic articles such as auto-body sheet metal, but also particularly on the so-called difficult substrates such as glass or aluminum which has not been pre-treated. Other materials which can successfully be adhered using the adhesion improvers according to the present invention are, for example, commercially-available textiles comprising synthetic fibers such as, in particular, polyesters.

The effect found according to the present invention is all the more surprising since, for example, neither Schiff bases nor compounds containing uretidine dione groups or isocyanurate groups, used alone or in admixture, show adhesion to the substrates which are difficult to adhere.

The compounds to be used according to the invention, which contain at least one azomethine group and one uretidine dione or isocyanurate group in the molecule, are reaction products of Schiff bases with compounds containing uretidine dione groups or iscoyanurate groups.

In addition to the aforementioned groups, each of the compounds contains still other reactive groups which facilitate a direct or indirect bonding of the components. Thus, for example, hydroxyl groups, mercapto groups, and, preferably, amino groups may be present as reactive groups in the Schiff base, while hydroxyl groups, mercapto groups, epoxy groups, and, preferably, isocyanato groups may be present in the components containing uretidine dione groups or isocyanurate groups.

Preferably, the components are so chosen that a direct bonding is possible, for example by the reaction of amino groups in the Schiff base with isocyanate groups or epoxy groups in the component containig uretidine dione or isocyanurate groups.

For this, the components are preferably combined in equivalent amounts, calculated on the reactive groups. However, excesses of one or the other of the components are also possible. The effect according to the present invention is not influenced by this. However, attention should be given to a possible interaction with the components of the plastisol recipe.

Indirect bonding, by way of so-called "bridge componets" which can react with the various reactive groups in each of the components, can also be carried out.

The adhesion improvers according to the invention can contain the following preferred groups in addition to azomethine, uretidine dione, or isocyanurate groups:
(a) amino groups,
(b) urea or urethane groups, and
(c) amide groups.

The Schiff bases, known per se, which are to be used according to the present invention, are prepared from amines and ketones or aldehydes according to conventional methods such as have been described, for example, by Norton et al., Journal of Organic Chemistry, 19 II, 1054–1065 (1954) and Mannich et al., Ber. dtsch. chem. Ges. 69, 2016 (1936).

For the preparation of the Schiff bases, such amines come into consideration which, after reaction with the carbonyl component, still contain free amine hydrogen atoms, particularly polyalkylene polyamines such as triethylene tetramine, tetraetheylene pentamine, tripropylene tetramine, tetrapropylene pentamine, dipropylene triamine, 3-(2-aminoethyl) aminopropylamine, N,N'-bis-(3-aminopropyl) ethylenediamine, diglycolamine, as well as higher polyethylene polyamines or plypropylene polyamines and, particularly, diethylene triamine.

For preparation of the Schiff bases to be used according to the invention, condensation products, carrying free amino groups, of polycarboxylic acids with an excess of polyvalent amines, which condensation products are designated in the art as polyaminoamids, can be used. Prefered polyaminoamides comprise dimerized higher unsaturated fatty acids and polyalkylene polyamines such as diethylene triamine, triethylene tetramine, dipropylene triamine, etc. The polyaminoamides comprising dimerized fatty acids, or polyaminoimidazolines which are formed therefrom by the cleavage of a further molecular of water, are known in the art as hardening agents for epoxy resins (cf. German Pat. Nos. 972,757 and 1,420,472).

Ketones which can be used include acetone, methylethyl ketone, diethyl ketone, optionally-substituted cyclohexanone, cyclopentanone, diisobutyl ketone, and particularly methylisobutyl ketone. As possible aldehydes, butyraldehyde, isobutryraldehyde, and benzaldehyde are mentioned.

The Schiff bases prepared in this manner can be employed alone or in admixture for further reaction.

The formation of uretidine diones by the dimerization of isocyanates,

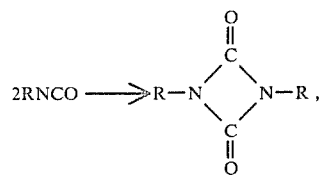

and of isocyanurates by the trimerization of isocyanates,

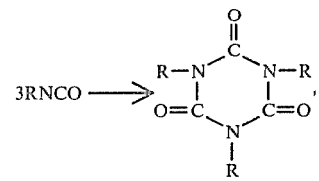

are disclosed and discussed in Advances in Urethane Science and Technology 1971, 1. As compounds containing uretidine dione or isocyanurate groups, the addition products prepared according to known methods from aliphatic and cycloaliphatic isocyanates, as well as from aromatic isocyanates, come into consideration (cf. German Offenlegungsschrift No. 1,934,763 describing the preparation of cyclic oligomers of 3-isocyanatomethyl-3,5,5-trimethylcyclohexyl-isocyanate (isophorone diisocyanate or "IPDI"), German Auslegeschrift No. 2,419,016 disclosing a long list of isocyanates suitable for isocyanurate formation, and German Offenlegungsschrift No. 2,221,170 which refers to still earlier patent publications teaching the formation of uretidine diones and disclosed polyisocyanates having uretidine dione groups).

Preferably, the known addition products formed from 2 or 3 mols of isophorone diisocyanate, as well as the also commercially-available addition product formed from 3 mols of tolylene diisocyanate and 2 mols of hexamethylene diisocyanate, and triglycidyl isocyanurate and tris-(hydroxyethyl)-isocyanurate are used.

Pre-polymeric compounds containing uretidine dione groups or isocyanurate groups, which can be prepared, for example, by the addition reaction of (1) an excess of isocyanate containing uretidine dione groups or isocyanurate groups with (2) polyols such as polyester diols, also come into consideration.

For modifying the properties of the adhesion improver prepared therefrom, mixtures containing a uretidine dione or isocyanurate together with isocyanates free of uretidine dione groups or isocyanurate groups are suitable.

As materials for linking the Schiff base and the uretidine dione or isocyanurate, all compounds can be used which can undergo addition reactions with the reactive groups of these components, particularly compounds containing isocyanate groups and compounds containing epoxide groups such as aliphatic or aromatic glycidyl compounds, particularly those containing glycidyl either groups and which are derived from bisphenols and novolacs.

The ratio of Schiff base and of the component containing uretidine dione or isocyanurate groups to the linking compounds is advantageously so chosen that one equivalent of the linking compound is present for each half equivalent, calculated in each case on the reactive groups, of the Schiff base and the component containing the uretidine dione or isocyanurate groups.

The adhesion improvers according to the invention can be used alone or in admixture in amounts from 0.05 percent to 4 percent, particularly from 0.05 percent to 1.0 percent, by weight of the plastisol formulation. Mixtures of the adhesion improvers of the invention with conventional adhesion improvers which are inert to the inventive compounds are also suitable for modification if normal, for example metallic, materials are to be coated. In the case of the so-called "difficult to adhere" materials, a decrease in the adhesion values, depending on the mixing ratios in a given case, must be taken into account.

The effect of the adhesion improver according to present invention is, one the one hand, dependent on the nature and the amount thereof in the plastisol recipe in question as well as on the nature of the substrate to be covered in a particular case. On the other hand, the composition of the plastisol formulation is also not without an influence. That is, because of the plurality of components in various plastisol recipes (PVC, plasticizer, extender, filler, stabilizer), the efficacy of the adhesion improver must be tested in each case. Any particular plastisol recipe is as a rule easily optimized using a few orientation tests.

A better understanding of the present invention and of its many advantages will be had by referring to the following specific Examples, given by way of illustration.

Preparation of Adhesion Improvers According to the Invention Adhesion Improver A The adhesion improver is an adduct prepared from a Schiff base comprising diethylene triamine (DTA) and methylisobutyl ketone (MBK) and an isocyanate containing uretidine groups prepared from 2 mols of isophorone diisocyanate (IPDI).

64.9 g of dimeric IPDI (as a 60 percent solution in "Shellsol A") containing 12.93 percent NCO and prepared, for example, as in German Offenlugungsschrift No. 1,934,763 is added dropwise at 50° C. over a period of 75 minutes to 53,6 g of a Schiff base prepared from DTA and MBK (amine number=629). The mixture is stirred for a further three hours at 50°-60° C. and diluted with "Shellsol A" to form a 70 percent solution having an amine number=169 (calc.=171) and NCO less than 0.1 percent.

The product, which has the formula

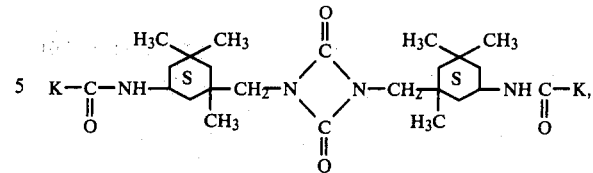

This structure and the structures given in the following examples are idealized and represent the main products. wherein K is the ketimine group

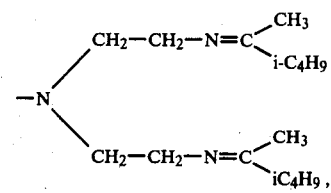

has an azomethine group content of 0.2/100 g.

Adhesion Improver B

The adhesion improver is prepared from a Schiff base comprising DTA and MBK added onto an isocyanate containing isocyanurate groups and prepared from 3 mols of toluenediisocyanate (TDI) and 2 mols of hexamethylene diisocyanate (HDI).

79 g of an isocyanurate comprising TDI and HDI (60 percent solution in butyl acetate) is added dropwise, together with 69.6 g of ethylene glycol acetate (EGA), over a period of one hour at 45°-50° C. to 53.6 g of a Schiff base comprising DTA and MBK. The mixture is stirred for a further four hours at a maximum temperature of 60° C. and a 50 percent solution is obtaind having an amine number =105 (calc. =111) and NCO less than 0.1 percent.

The product, which has the formula

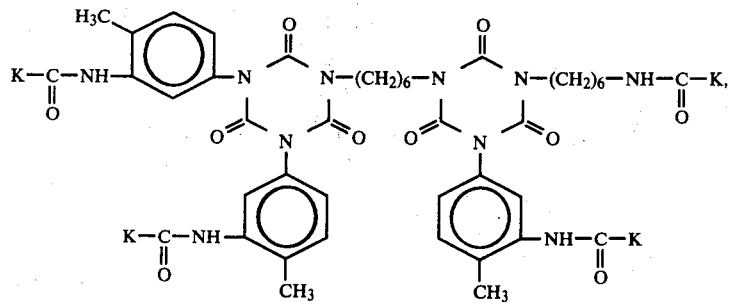

wherein K is the same ketimine group as in Example A, has an azomethine content of 0.4/100 g.

Adhesion Improver C

The adhesion improver is an adduct formed from a Schiff base comprising DTA and MBK and an isocyanate containing isocyanurate groups and prepared from 3 mols of isophorodiisocyanate.

80.4 g of the Schiff base comprising DTA and MBK (amine number=629) are heated to 50° C. 102.9 g of a commercially available trimerized IPDI having 12.23 percent NCO (70 percent solution in EGA/xylene 1:2) are added dropwise over a period of 75 minutes. The mixture is stirred for a further three hours at 50°-60° C.

and diluted with EGA/xylene in a ratio of 1:2 to form a 70 percent solution.

The solution has an amine number = 154 (calc. = 154) and a NCO-content of less than 0.1 percent.

The product, which has the formula

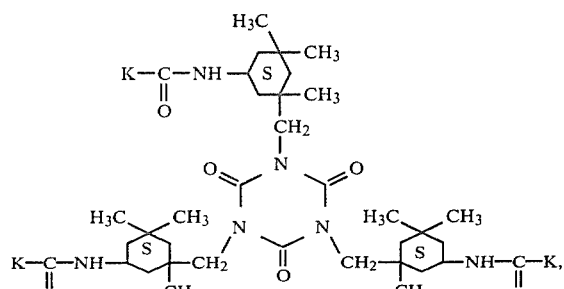

wherein K is the same ketimine group as in Example A, has an azomethine content of 0.4/100 g.

Adhesion Improver D

The improver is prepared by the addition of a Schiff base comprising DTA and MBK onto triglycidylisocyanurate.

29.7 g of triglycidylisocyanurate are added with stirring at 50° C. over about 30 minutes to a solution of 80.4 g of the Schiff base described in (C) in 47.3 g of EGA. The mixture is heated to 110° C. and stirred for about 3 hours at this temperature.

The solution has an amine number = 285.

The product, which has the formula

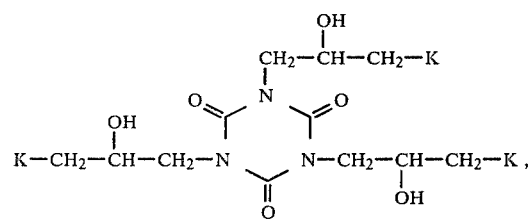

wherein K is the same ketimine group as in Example A, has an azomethine content of 0.54/100 g.

Adhesion Improver E

The adhesion improver is the reaction product of polycaprolactone-diol, IPDI-isocyanurate, and a ketimine formed from DTA and MBK.

26.8 g of the Schiff base described in (C) and 51.5 g of a 70 percent solution of IPDI-isocyanurate in xylene/EGA 2:1 are added to a solution of 50.8 g of polycaprolactone-diol (OH number = 55.2) contained in 32.7 g of EGA and 65.4 g of xylene, whereby the temperature of the reaction mixture spontaneously rises from room temperature to 65° C. The mixture is permitted to cool to room temperature and is stirred until NCO can no longer be detected by IR-spectroscopy. A 50 percent solution in xylene/EGA having an amine number = 41 (calc. = 43.5) is obtained.

The product, which has the formula

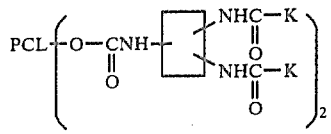

wherein PCL represents the polycaprolactone diol residue after reaction of the two-OH groups thereof with isocyanate groups,

respresents the complex tetracyclic IPDI-isocyanurate group shown in Example C, and K in the ketimine group shown in Example A, has an azomethine group content of 0.18/100 g.

Adhesion Improver F

The adhesion improver is the reaction product formed between polycaprolactone diol, IPDI-isocyanurate and a ketimine formed between MBK and diglycolamine, $HN_2—CH_2—CH_2—O—Ch_2—CH_2OH$(-DGA).

7.5 g of the Schiff base comprising DGA and MBK and 20.64 g of a 70 percent solution of IPDI-isocyanurate in xylene/ethyl glycol acetate (2:1) are added to a solution of 40 g of polycaprolactone diol (OH-number = 28.05) in 25.7 g of ethyl glycol acetate and 51.4 g of xylene. The temperature of the reaction mixture increases from room temperature to about 60° C. The mixture is permitted to cool to room temperature and is stirred until NCO can no longer be detected by IR-spectroscopy.

The product, which has an amine number of 18 and an NCO content less than 0.1 percent, is obtained as an approximately 50 percent solution in xylene/ethyl glycol acetate. It has the formula

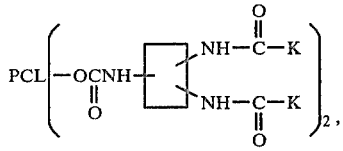

wherein PCL is a polycaprolactone diol residue,

is the tetracyclic IPDI-isocyanurate group of Example C, and K is

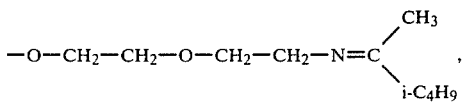

and contains 0.066 azomethine groups per 100 grams.

Adhesion Improver G

The adhesion improver is an adduct formed between a Schiff base in turn formed between N-aminoethyl piperazine (NAEP) and isobutyraldehyde and an isocyanate containing uretidine dione groups and formed from two mols of IPDI.

64.9 g of a dimeric IPDI (as a 60% solution in "Shellsol A") having a NCO content of 12.93% and prepared, for example, as described in DE-OS No. 1,934,736, are added dropwise at 50° C. over a period of 75 minutes to 36.8 g of a Schiff base formed between NAEP and isobutyraldehyde (amine number=9.5).

The mixture is stirred for a further three hours at 50°-60° C. and diluted with "Shellsol A" to form a 70% solution having an amine number of 204 (calc.=209) and a content of NCO less than 0.1%.

The product has the formula

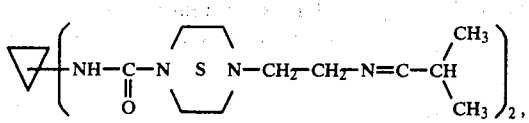

wherein

is the tricyclic IPDI-uretidine dione group present in the adhesion improver of Example A, and has a content of azomethine groups of 0.26/100 g.

Adhesion Improver H

The adhesion improver is the addition product formed between a Schiff base, in turn formed between dipropylene triamine and cyclohexanone, and an isocyanate containing uretidine dione groups formed from two mols of IPDI.

64.9 g of a dimeric IPDI (60% solution in "Shellsol A") having 12.93% NCO and prepared, for example, according to DE-OS No. 1,934,736, are added dropwise to 58.4 g of a Schiff base formed between dipropylene triamine and cyclohexanone (amine number=576).

The mixture is stirred for a further three hours at 50°-60° C. and diluted with "Shellsol A" to form a 70% solution having an amine number of 160 (calc.=161) and an NCO content less than 0.1%.

The product has the formula

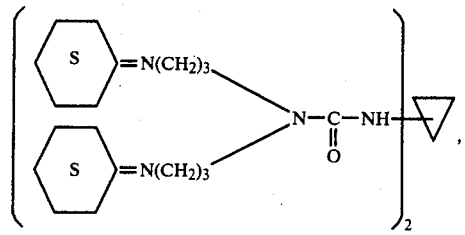

where, again,

is the tricyclic IPDI-uretidine dione group present in the adhesion improver of Example A. The azomethine content is 0.41/100 g.

Adhesion Improver I

The adhesion improver is the adduct formed between a Schiff base, in turn formed between 3-aminopropanol-1 and diisobutyl ketone, and an isocyanate containing isocyanurate groups and formed from 3 mols of IPDI.

60 g of a Schiff base formed between 3-aminopropanol-1 and diisobutyl ketone (amine number=281) are warmed to 50° C. After the addition of 0.02 g of dibutyltin dilaurate, 102.9 g of a commercially-available trimerized IPDI containing 12.23% NCO (70% in ethyl glycol acetate/xylene, 1:2) are added dropwise over a period of 30 minutes. The mixture is stirred for a further 3 hours at about 50° C., diluted with ethylene glycol acetate/xylene (1:2) to form a 70% solution, and left to stand overnight.

A solution having an amine number of 91 (calc.=92.5) and a NCO-content less than 0.1% is obtained.

The product has the formula

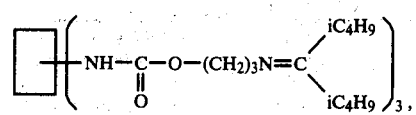

wherein

is the tetracyclic IPDI-isocyanurate group present in the adhesion improver of Example C, and has an azomethine content of 0.23/100 g.

Use of the Adhesion Improvers

The adhesion improvers according to the invention were tested using the following plastisol formulation:

45 parts by weight of a polyvinyl chloride, capable of being put into the form of a paste and containing an emulsifier, having a K-value=70 ("Vinnol P 70"), 55 parts by weight of phthalic acid-di-2-ethylhexyl-ester, 100 parts by weight of a filler mixture comprising 50 percent of chalk and 50 percent of barium sulfate, and 1.5 parts by weight of diisobutyl-tin-di-isooctyl-thiogly-colic-acid-ester.

The plastisol was prepared in known fashion by intimate admixture of the polyvinyl chloride powder with the plasticizer as well as the fillers and the stabilizer. Thereafter, adhesion improvers A-I according to the invention were added with stirring in an amount of 1.0 percent by weight in order to obtain the finished plastisol.

The adhesive values attainable with the plastisols according to the present invention in adhesive joints were determined in accordance with DIN No. 53283.

For this, non-pretreated aluminum sheets were used as the parts for adhesion. The size of the parts (width×length×thickness) was 2.5 cm×10.5 cm×0.15 cm.

The thickness of the layer of the plastisol in the adhesive joints was adjusted to 2 mm using spacers.

The parts adhered were heated for 30 minutes at 160° C. and overlapped during the heating period by a distance of 15 mm.

The adhesion values reported in the following Table were observed.

Comparative values are shown in following Table II, wherein, again, 1.0 percent by weight of adhesion improver was used in each case.

TABLE I

| Adhesion Improver | Bond Strength on Non-pretreated Aluminum (N/mm$^2$) |
| --- | --- |
| A (70% in "Shellsol A") | 3.94 |
| B (50% in butyl acetate/EGA) | 3.26 |
| C (70% in EGA/xylene 1:2) | 2.95 |
| D (70% in EGA) | 3.62 |
| E (50% in EGA/xylene 1:2 | 3.68 |
| F (50% in EGA/xylene) | 3.15 |
| G (70% in "Shellsol A") | 3.12 |
| H (70% in "Shellsol A") | 3.51 |
| I (70% in EGA/xylene 1:2) | 2.90 |

TABLE II

| Comparison Example | Composition of Adhesion Improver | Bond Strength on Non-pretreated Aluminum (N/mm$^2$) |
| --- | --- | --- |
| 1 | Commercially available IPDI-isocyanurate as in Example C, prepared according to German Auslegeschrift 24 19 016. | 0.3 |
| 2 | A mixture of 60 parts by weight of isocyanurate and 40 parts by weight of hexamethylene diamine-MBK-ketimine, according to German Offenlegungsschrift 22 21 170. | 0.73 |
| 3 | An addition product of 2 mols of isophorone diisocyanate containing uretidine dione groups. | no adhesion |
| 4 | Reaction product of DTA-MBK-ketimine and isophorone diisocyanate in a mol ratio of 2:1, as in U.S. Pat. No. 4,151,317. | 0.41 |
| 5 | Reaction product of dimerized TDI and DTA-MBK-ketimine (40 percent in "Shellsol A"). | no adhesion |

What is claimed is:

1. An improved plastisol of a vinyl chloride polymer, said plastisol comprising from about 0.1 to about 4.0 percent, by weight of said plastisol, of a Schiff base containing from 0.05 to 1.0 azomethine groups per 100 grams of compound and further containing a uretidine dione or isocyanurate group in the molecule.

2. An improved plastisol as in claim 1 wherein said Schiff base contains from 0.05 to 0.6 azomethine groups per 100 grams of compound.

3. A method for protectively coating a substrate which comprises applying to said substrate a coating of a plastisol containing a vinyl chloride polymer and then baking the coating at a temperature from 100° C. to about 200° C., said plastisol further comprising from about 0.1 to about 4.0 percent, by weight of said plastisol, of a Schiff base containing from 0.05 to 1.0 azomethine groups per 100 grams of compound and further containing a uretidine dione or isocyanurate group in the molecule.

4. A method as in claim 3 wherein said Schiff base containing from 0.05 to 0.6 azomethine groups per 100 grams of compound.

5. A method as in claim 3 wherein said substrate is selected from the group consisting of nonpretreated aluminum, glass, and polyester textiles.

6. A plastisol as in claim 1 wherein said Schiff base is formed between a Schiff base comprising diethylene triamine and methylisobutyl ketone and an isocyanate containing uretidine groups prepared from 2 mols of isophorone diisocyanate.

7. A plastisol as in claim 1 wherein said Schiff base is formed between a Schiff base comprising diethylene triamine and methylisobutyl ketone and triglycidylisocyanate.

8. A plastisol as in claim 1 wherein said Schiff base is formed between a Schiff base comprising diethylene triamine and methylisobutyl ketone and polycaprolactonediol and an isocyanate containing isocyanurate group prepared from 3 mols of isophorone diisocyanate.

* * * * *